UNITED STATES PATENT OFFICE 2,615,870

COPOLYMERS OF VINYLIDENE CYANIDE WITH VINYLIDENE CHLORIDE

Vernon L. Folt, Akron, Ohio, assignor to The B. F. Goodrich Company, New York, N. Y., a corporation of New York No Drawing. Application February 14, 1950, Serial No. 144,197

5 Claims. (Cl. 260—78.5)

This invention relates to the preparation of novel copolymers of vinylidene cyanide with vinylidene chloride, which copolymers are extremely useful synthetic resins especially in the preparation of filaments and films.

In U. S. Patent 2,476,270 to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. These methods involve, respectively, the pyrolysis at 400° C. to 750° C. of 1-acetoxy-1,1-dicyano ethane, the pyrolysis of 1,1,3,3-tetracyanopropane and the pyrolysis at 400° C. to 800° C. of 4,4-dicyanocyclohexene, 4,4-dicarbamyl cyclohexene or 4-cyano-4-carbamyl cyclohexene. In another copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3 it reacts therewith to give solid 4,4-dicyanocyclohexane.

It has now been discovered that when monomeric vinylidene cyanide of the above physical and chemical characteristics is copolymerized with vinylidene chloride, in the presence of a free radical polymerization catalyst and in a manner such that the polymerization charge contains from 5 to 90 mole per cent of monomeric vinylidene cyanide new and highly useful copolymers are obtained. These copolymers are essentially 1:1 alternating copolymers, that is, copolymers possessing the structure:

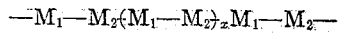

wherein each $M_1$ is a vinylidene cyanide unit

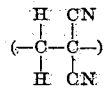

and each $M_2$ is a unit of vinylidene chloride

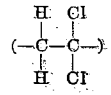

and $x$ is a polydigit number, preferably from 100 to 15,000.

The fact that the copolymers thus obtained are essentially 1:1 alternating copolymers is determined by analysis of the copolymer for nitrogen and/or chlorine content which shows that the two monomers enter the polymer chain in essentially equimolar ratios regardless of the degree of monomer to polymer conversion and of charging ratio provided the latter is within the range of 5 to 45 mole per cent vinylidene cyanide. Further supporting evidence for this fact is found in the copolymerization equation of F. M. Lewis, C. Walling, et al., Journal of the American Chemical Society, 70, 1519 (1948):

$$\frac{d[M_1]}{d[M_2]}=\frac{[M_1]}{[M_2]}\frac{r_1[M_1]+[M_2]}{r_2[M_2]+[M_1]}$$

wherein $[M_1]$=Concentration of unreacted monomer $M_1$
$[M_2]$=Concentration of unreacted monomer $M_2$
$r_1$=Ratio of the rate constants for the reaction of an $M_1$ type radical with $M_1$ and $M_2$ respectively
$r_2$=Ratio of the rate constants for the reaction of an $M_2$ type radical with $M_2$ and $M_1$ respectively When the product $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

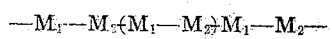

structure shown hereinabove. When $M_1$ is vinylidene cyanide, and $M_2$ is vinylidene chloride, it has been found that $r_1$=0.093 and $r_2$=0.0121; therefore, the product of $r_1$ and $r_2$ is 0.000592, which approaches zero so that the equation indicates that essentially alternating copolymers are formed.

The polymerization of this invention can be carried out in a number of ways. Since vinylidene cyanide and vinylidene chloride are mutually soluble in one another, the polymerization may be carried out without the use of a solvent or other liquid medium for the monomers, that is, simply by mixing together the two monomers and the peroxygen catalyst and allowing the mixture to stand, whereupon polymerization occurs to form the desired copolymer as a white resinous powder of small particle size. The copolymer thus formed may be separated from the polymerization mixture by adding benzene or other liquid aromatic hydrocarbon to dissolve the remaining monomers and then filtering off the copolymer.

A second and preferred method consists in first dissolving the vinylidene cyanide and the vinylidene chloride in benzene or other aromatic solvent such as toluene, methyl toluene, trichloro benzene, or the like, preferably free from impurities which initiate the ionic polymerization of the vinylidene cyanide monomer, and in an amount such that the solvent comprises about 30 to 80% by weight of the total solution. A polymerization catalyst is included in this solution to effect the polymerization and the copolymer formed can be removed from the polymerization mixture simply by filtering.

Polymerization by the above methods occurs readily at room temperature. However, the polymerization may also be carried out at much lower temperatures, for example, as low as 0° C., and at temperatures as high as 100° C., the use of temperatures in the range of 20 to 80° C. being preferred.

It is to be understood, of course, that regardless of the polymerization method utilized, the polymerization should be stopped before either of the monomers is entirely consumed, in order that pure copolymer will be obtained. Otherwise, when either of the monomers is completely used up, the product will contain straight polymer resulting from the polymerization of the remaining monomer. Accordingly, it is often desirable to add, continuously or intermittently, fresh quantities of one or both of the monomers, and also of catalyst and solvent if desired, to the polymerization mixture during the course of the polymerization, thus taking fullest advantage of the capacity of the equipment and in effect operating a continuous or semi-continuous process.

The catalyst which is utilized in the polymerization process is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general, from 0.01 to 2.0% by weight (based on the total weight of the monomers charged) of the catalyst is utilized, although smaller or larger amounts may be utilized if desired. By regulating the amount of the catalyst it is possible to control very effectively and accurately the molecular weight of the copolymer. For instance, to obtain highest molecular weight copolymer, a small quantity of catalyst is used, while lower molecular weight copolymers are obtained by the use of larger amounts of catalyst.

The following examples illustrate the preparation of copolymers of vinylidene cyanide with vinylidene chloride in accordance with this invention, but are not to be construed as a limitation upon the scope thereof, for there are, of course, numerous possible variations and modifications. In the examples all parts are by weight.

EXAMPLES I TO III

A series of copolymers are prepared by dissolving varying amounts of vinylidene cyanide and vinylidene chloride in 15.8 parts benzene, and adding to each of the mixtures 0.15% by weight (based on the total weight of the monomers) of o,o'-dichlorobenzoyl peroxide as a polymerization catalyst. Polymerization is permitted to proceed with agitation for a period of 16 hours at room temperature after which the polymerization is stopped by cooling the mixtures to −20° C. The solid resinous copolymer is recovered from the polymerization mixture by filtering. The charging ratios of the two monomers, mole per cent vinylidene cyanide in the charge and the mole per cent of vinylidene cyanide in the copolymer are recorded in Table I below:

Table I

| Example | Parts Vinylidene Cyanide Charged | Mole Percent Vinylidene Cyanide Charged | Parts Vinylidene Chloride Charged | Mole Percent Vinylidene Cyanide in Copolymer |
|---|---|---|---|---|
| I | 6.0 | 65.08 | 4.0 | 51.81 |
| II | 7.0 | 74.35 | 3.0 | 52.02 |
| III | 7.5 | 78.89 | 2.5 | 53.89 |

EXAMPLES IV TO XI

In the following examples vinylidene cyanide and vinylidene chloride are mass polymerized by mixing the monomers together and adding to each charge 0.15% by weight of o,o'-dibromobenzoyl peroxide as the polymerization catalyst. After varying periods of time the polymerization is stopped by cooling the mixtures as in Examples I to III. Benzene is added to the polymerization mixtures to dissolve the remaining monomers and the solid resinous vinylidene cyanide: vinylidene chloride copolymer is recovered by filtering the resulting benzene slurry. In Table II below there are recorded the mole per cent vinylidene cyanide in each charge, the time during which the polymerization is permitted to continue, the per cent monomer to polymer conversion (based on total monomers charged) and the mole per cent vinylidene cyanide in the resulting copolymer (based on N and Cl analysis).

Table II

| Example | Mole Percent Vinylidene Cyanide Charged | Polymerization Time (Hours) | Percent Conversion | Mole Percent Vinylidene Cyanide in Copolymer |
|---|---|---|---|---|
| IV | 6.14 | 16 | 2.0 | 46.31 |
| V | 12.13 | 16 | 3.5 | 49.05 |
| VI | 17.98 | 16 | 3.6 | 50.90 |
| VII | 23.70 | [1] 16 to 24 | [2] 4.0 to 18.0 | 52.39 |
| VIII | 29.29 | 16 | 6.1 | 51.94 |
| IX | 34.75 | [1] 16 to 24 | [2] 7.0 to 17.3 | 51.46 |
| X | 45.31 | [1] 16 to 24 | [2] 7.0 to 17.5 | 51.55 |
| XI | 55.41 | [1] 16 to 24 | [2] 8.0 to 18.5 | 51.95 |

[1] Several runs carried out at polymerization times within this range, utilizing the same charging ratios.
[2] Several runs carried out using the same charging ratios polymerized to different conversions within this range.

It will be seen from the above examples that an essentially 1:1 alternating copolymer is obtained when the polymerization charge contains from 5 to 90 mole per cent of vinylidene cyanide. When the polymerization is carried out according to the other methods described hereinabove, or at temperatures as high as 50° C. or higher, or utilizing other of the peroxygen catalyst herein disclosed, the essentially 1:1 alternating copolymer is again readily obtained.

The copolymers of vinylidene cyanide with vinylidene chloride prepared according to this invention are useful in the preparation of solutions from which can be spun fibers and filaments of any desired size which possess many advantageous properties including extremely high strength, low elongation, outstanding resistance to weathering and excellent resistance to the action of chemicals. Thus, for instance, when the copolymers obtained in the above examples are dissolved in dimethyl formamide, viscous solutions result, and such solutions are suitable for being spun through a spinneret into a spinning bath to give excellent filaments. The physical properties of these filaments can be improved by a "hot-stretching" process, whereby the filament is stretched in a hot zone in a series of steps, a process disclosed in a copending application of Harry Gilbert, Serial No. 113,018, filed August 29, 1949. In addition to the use of dimethyl formamide, other solvents for the copolymers may also advantageously be used, and the copolymer solutions are also useful for the casting of valuable films having good flexibility properties. Also, since the copolymers of this invention soften when heated to high temperatures, they may be melt spun and may be used in the preparation of molded objects. They possess softening points of the order of 220° to 250° C.

Although specific examples of the invention have been herein described, it is not intended to limit the invention solely thereto, but to include all of the variations and modifications falling within the spirit and scope of the appended claims.

I claim:

1. A copolymer of vinylidene cyanide and vinylidene cyanide and vinylidene chloride, said copolymer possessing essentially the structure $$-M_1-M_2(M_1-M_2)_x M_1-M_2-$$

wherein each $M_1$ represents a vinylidene cyanide unit, each $M_2$ represents a unit of said vinylidene chloride and $x$ is a polydigit number, in which copolymer the vinylidene cyanide units are derived from monomeric vinylidene cyanide which is a liquid at room temperature and a crystalline solid at 0° C., having a melting point, when in purest form, of substantially 9.0° C. to 9.7° C., and being characterizable chemically by the ability to undergo on contact with water at room temperature an instantaneous homopolymerization reaction to give a solid, water-insoluble resin.

2. The method which comprises preparing a mixture containing monomeric vinylidene cyanide, monomeric vinylidene chloride and a peroxygen catalyst, the monomeric vinylidene cyanide being present in said mixture in an amount from 5 to 90 mole per cent based on the total monomer weight and being a liquid at room temperature and a crystalline solid at 0° C. having a melting point, when in purest form, of substantially 9.0° C. to 9.7° C., and being characterizable chemically by the ability to undergo on contact with water at room temperature an instantaneous homopolymerization reaction to give a solid, water-insoluble resin, and maintaining the said mixture at a temperature of 20° C. to 80° C. for a time sufficient to effect copolymerization of the said vinylidene cyanide and vinylidene chloride and formation of a solid, resinous copolymer possessing essentially the structure $$-M_1-M_2(M_1-M_2)_x M_1-M_2-$$

wherein each $M_1$ is a vinylidene cyanide unit, each $M_2$ is a unit of said vinylidene chloride and $x$ is a polydigit number.

3. The method which comprises preparing a solution containing monomeric vinylidene cyanide, monomeric vinylidene chloride, a peroxygen catalyst and a solvent selected from the class consisting of aromatic hydrocarbons and chlorinated aromatic hydrocarbons, the monomeric vinylidene cyanide being present in said solution in an amount from 5 to 90 mole per cent based on the total monomer weight and being a liquid at room temperature and a crystalline solid at 0° C., having a melting point, when in purest form, of substantially 9.0° C. to 9.7° C., and being characterizable chemically by the ability to undergo on contact with water at room temperature an instantaneous homopolymerization reaction to give a solid, water-insoluble resin, and maintaining the said solution at a temperature of 20° C. to 80° C. for a time sufficient to effect copolymerization of the said vinylidene cyanide and vinylidene chloride and precipitation of a solid, resinous copolymer from the solution, said copolymer possessing essentially the structure $$-M_1-M_2(M_1-M_2)_x M_1-M_2-$$

wherein each $M_1$ is a vinylidene cyanide unit, each $M_2$ is a unit of vinylidene chloride and $x$ is a polydigit number.

4. The method of claim 3 in which the solvent comprises from 30% to 80% by weight of the solution and the peroxide catalyst is present in an amount from 0.01% to 2% by weight based on the total amount of monomeric vinylidene cyanide and monomeric vinylidene chloride.

5. The method of claim 3 further characterized in that the solvent is benzene and the peroxygen catalyst is o,o'-dichlorobenzoyl peroxide.

VERNON L. FOLT.

REFERENCES CITED

The following references are of record in the file of this patent:

UNITED STATES PATENTS

| Number | Name | Date |
|--------|------|------|
| 2,455,653 | Bralley | Dec. 7, 1948 |
| 2,466,395 | Dickey | Apr. 5, 1949 |